Patented June 30, 1953

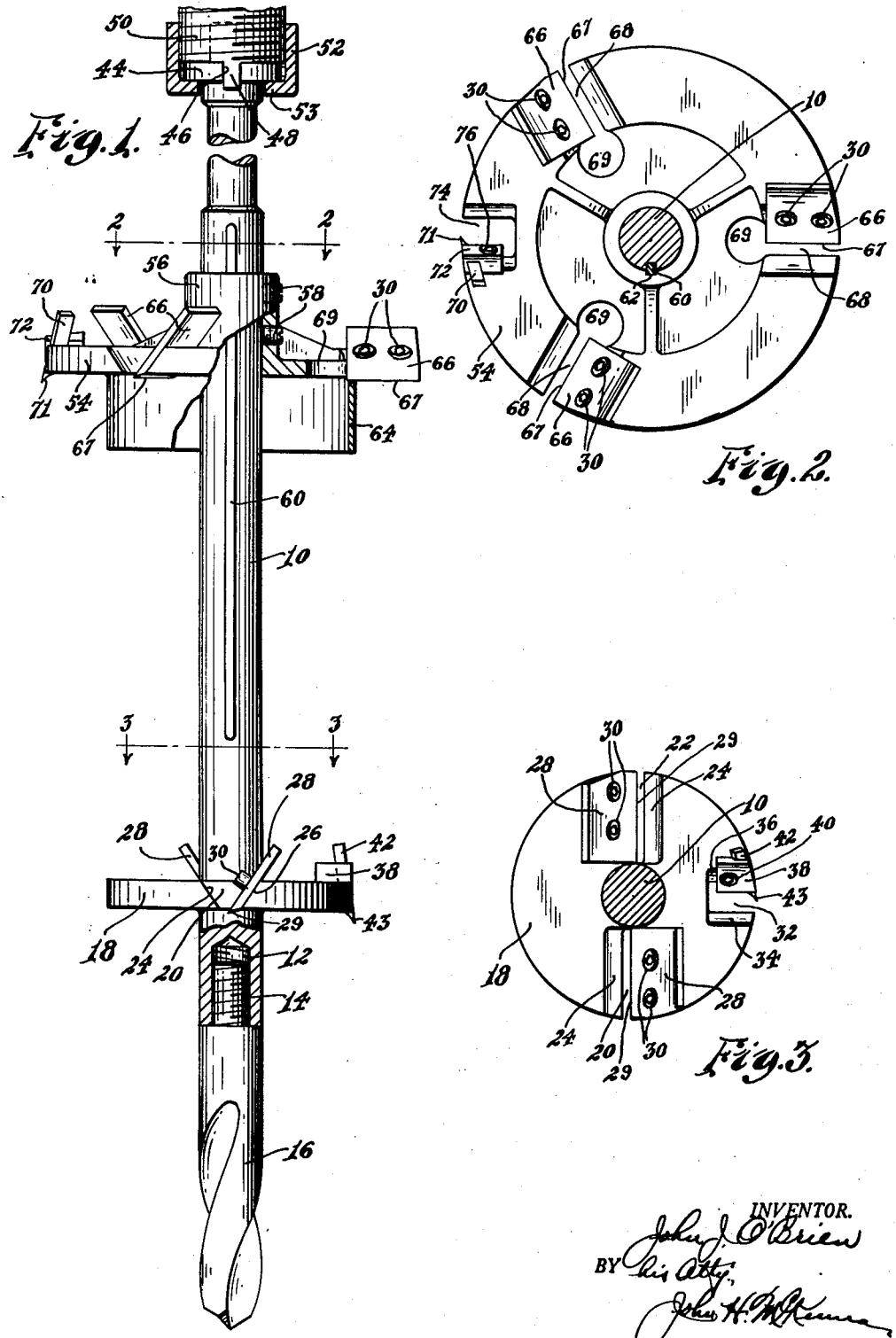

2,643,692

UNITED STATES PATENT OFFICE 2,643,692

COMPOUND BORING TOOL

John J. O'Brien, Elmhurst, N. Y.

Application March 7, 1951, Serial No. 214,315

2 Claims. (Cl. 145—125)

This invention relates to improvements in boring tools and more particularly to boring tools capable of quickly boring relatively large circular holes in floors, platforms, walls and the like. For example, my improved tool is especially suited for quickly boring holes of desired diameters through the planking of docks, for receiving openable closures required for fire protection purposes, and has proven extremely advantageous for use by firemen to quickly bore holes through floors, walls and partitions, instead of cutting through with an ax, when it becomes necessary to pass a hose through a floor, wall or partition in the process of fighting a fire in a building. However, it should be understood that the invention is not limited to any particular sphere of use but provides a general-utility boring tool which is capable of boring and/or counter-sinking relatively large holes through wood and comparable materials more effectively and efficiently than the prior comparable boring tools of which I am aware.

It is among the objects of the invention to provide a rotary boring tool wherein a circular disk has a pilot means at its axis for guiding the concentric travel of a cutter at the periphery of the disk, and has a plurality of radial cutting edges disposed substantially in a common plane in advance of the disk and adapted to progressively remove material circumscribed by the peripheral cutter and located between the latter said cutter and said pilot means. According to the invention, a pilot means at the axis of the circular disk drills a pilot hole, or engages in a previously drilled pilot hole, in the material through which a larger hole is to be bored, the pilot means being in advance of and substantially smaller in diameter than the disk, whereby said pilot means guides the cutter at the periphery of the disk on a circular course concentric to the axis of the disk. The radially disposed cutting edges in advance of the disk have radial extent from the circumference of the circle of cutting of the peripheral cutter to the circumference of the pilot hole in which the pilot means is engaged, whereby the radial cutters progressively remove all material within the circle of cutting of the peripheral cutter as the rotating tool advances axially into the material which is being bored.

Another object of the invention is to provide a boring tool wherein a circular disk has diameter slightly less than the hole which is to be bored and has a plurality of radially disposed cutting edges extending inward from its periphery and located in a common plane a little in advance of the disk, and the disk has a cutter mounted at its periphery with a cutting portion projected in advance of the disk slightly beyond the said common plane of said cutting edges, and set slightly outward of the periphery of the disk, whereby the peripheral cutter determines a diameter for the bored hole slightly greater than the diameter of the disk, and the radially disposed cutting edges progressively remove material within the circle of cutting of the peripheral cutter as the rotating tool advances into the material which is being bored.

A further object of the invention is to provide a boring tool wherein a pilot means is adapted to drill a pilot hole, or to engage in a previously drilled pilot hole, and one circular cutter-carrying disk has a fixed concentric relation to the pilot means, and another circular cutter-carrying disk, of larger diameter, is adjustable along the axis of the pilot means in concentric relation thereto, the larger disk having a pilot means thereon for fitting a hole bored by the cutters of the smaller disk, each said disk having a peripheral cutter thereon, and each having a plurality of radial cutting edges extending inward from the peripheral cutter and disposed in a common plane in advance of their carrying disk, whereby the peripheral cutter of the smaller disk cuts on a circle slightly larger in diameter than its carrying disk and the radial cutting edges gradually remove material within the circle, and the cutter and cutting edges of the larger disk acting similarly when the latter's pilot means is engaged in a hole bored by the smaller disk, thereby to enlarge the diameter of the previously bored hole or to provide a counter-sink for the previously bored hole.

It is, moreover, my purpose and object generally to improve the structure and operative efficiency of boring tools, and more especially such tools designed to bore through wood and comparable materials.

In the accompanying drawing:

Fig. 1 is a side elevation of a boring tool embodying features of my invention, portions being broken away to show interior constructions;

Fig. 2 is a cross-sectional view on line 2—2 of Fig. 1; and

Fig. 3 is a cross-sectional view on line 3—3 of Fig. 1.

Referring to the drawings, the illustrated boring tool comprises a solid cross-sectionally round rod 10 having one end portion recessed to form a socket 12 and interiorly threaded at 14 for reception of the shank part of a drill 16 which is suitably shaped and threaded for screwing into the interiorly threaded socket. Obviously, any other conventional means may be provided for removably connecting the drill 16 to the rod 10.

Fixed on rod 10, adjacent to the socket 14, is a circular disk 18 which may be formed integral with the rod or may be a separate element secured thereto in any conventional manner. Disk 18 has two oppositely disposed notches 20, 22 extending from the periphery of the disk radially inward at opposite sides of the disk axis. Each notch 20, 22 extends radially inward to the shaft 10, and each has inclined side walls 24, 26 of which one constitutes a support on which a cutter blade 28 may be mounted in each notch. As represented, each blade 28 is removably secured on its support by two screws 30, and the cutting edges 29 of the two blades are disposed in a common plane, each on, or approximately on, a radius of disk 18.

A third radial notch 32 in disk 18 has inclined side walls 34, 36 on one of which a tool-holding block 38 is removably secured by a screw 40. Block 38 supports the inclined peripheral cutting tool 42 whose cutting point 43 is disposed a little in advance of the plane of the radial cutting edges 29, and a little outward of the circumference of the disk 18.

The upper end of rod 10 may be formed in any manner for gripping coaction with a chuck or socket of any conventional portable power means, such as an electric power drill, for example. As represented in the drawing, the upper end of rod 10 is formed with a flange 44 which has one or more notches 46 in its periphery for reception of one or more key projections 48 on an exteriorly threaded rotating part 50 of the power means. The interiorly threaded coupling member 52 screws on rotating part 50 and has an annular portion 53 for engaging under flange 44, whereby the flange becomes clamped against the end of rotating part 50 when the coupling member is tightened, with the part 50 and rod 10 securely locked against relative rotation.

In the illustrated preferred embodiment of my boring tool, a second cutter-carrying disk 54 is adjustably keyed to rod 10 for selective setting along the rod relative to the fixed disk 18. As shown, disk 54 has a boss 56 thereon, and two set screws 58 extend through the boss for securing the disk in any selected position along rod 10, the rod having the long key 60 slidably engaging in the key-groove 62 in the disk and boss. The disk 54 may be of any desired diameter greater than the diameter of disk 18, and has the pilot sleeve 64 fixed to its under side of diameter to nicely fit a hole bored by the cutting tool 42 and the radial cutting blades 28 on disk 18.

The larger diameter disk 54 has a plurality of cutting blades 66 mounted thereon generally similar to the blades 28 on disk 18, each being mounted on an inclined side wall of a notch 68 extending inward from the periphery of the disk. However, disk 54 has three equally spaced notches 68 and three cutting blades 66, each blade being removably secured in its notch by the screws 30, with its cutting edge 67 on, or approximately on, a radius of the disk, and with the cutting edges 67 of all of the blades 66 in a common plane slightly in advance of disk 54. The cutting edge of each blade 66 extends from the periphery of disk 54 inward to or slightly beyond the circumference of the pilot sleeve 64, and circular enlargements 69 of the notches, inward of the blades, facilitate the escape, inwardly and then downwardly, of chips and other material removed by the cutting blades.

Disk 54 also has a peripheral cutting tool 70 thereon, comparable to the cutting tool 42 on disk 18. Tool 70 is mounted in a block 72 secured in a disk notch 74 by screw 76, with the point of the tool set slightly outward of the periphery of disk 54 and slightly in advance of the plane of the cutting edges 67 of blades 66. Hence, assuming that pilot sleeve 64 is engaged in a hole bored by the cutters on disk 18, the peripheral tool 70 of disk 54 cuts circularly to define the circumference of the larger hole that is to be bored concentric to the pilot hole, and the blades 66 gradually remove the material between the circular cut of tool 70 and the circumference of pilot sleeve 64. This larger hole may be bored entirely through the floor or wall which is being bored, or the larger diameter cutting may extend only part way through, as a counter-sink for receiving a closure frame, for example, when an openable closure is to be provided for the hole bored by the cutters on the smaller disk 18.

Obviously, the number of cutting blades 28 and 66 on the disks may be varied to suit particular requirements, and more than one peripheral cutting tool may be provided on one or both disks, if desired. Also, it is not necessary that a drill be included at the leading end of the tool. A suitable pilot hole may be drilled separately, in which case only the pilot socket 14, or a comparable pilot means, would be essential for ensuring concentric boring by the disk cutters.

It is intended that the patent shall cover, by suitable expression in the appended claims, whatever features of patentable novelty exist in the invention disclosed.

I claim as my invention:

1. A boring tool comprising a rigid straight rod having a cross-sectionally round pilot portion at one end and means at its other end for connection of the rod to a rotating power mechanism, a disk fixed on the rod adjacent to the said pilot means, said disk having diameter substantially greater than the pilot means and having a plurality of notches extending inward from the periphery of the disk each to a location which is outward from the axis of said rod a distance approximating the radius of the pilot means, a cutting blade mounted in each of said notches, each blade having a cutting edge approximately equal in length to the depth of a said notch and disposed slightly in advance of the disk and approximately on a radius of said disk, the said cutting edges of all of the blades being similar and of uniform radial extent approximately in a common plane at right angles to the axis of said rod, and a cutting tool adjustably mounted at a peripheral region of the disk substantially spaced from each of said blades and having a cutting portion tapering to a mere point which is disposed outward of the periphery of the disk and projected obliquely outward with respect to the peripheral surface of the disk and obliquely forward in the direction of rotation of the disk and slightly in advance of said cutting edges in the direction of axial travel of the boring tool, said pilot means being adapted to engage in a pilot hole, and the pointed end portion of said cutting tool being adapted to cut the circumference of a hole which is being bored to a diameter appreciably larger than the diameter of the disk, while said cutting edges gradually remove material circumscribed by the cutting tool and outside of the circle of said pilot hole.

2. A boring tool comprising a rigid straight rod having a drill at one end and means at its other end for connection of the rod to a rotating power mechanism, a disk fixed on the rod adjacent to said drill, a cutting tool mounted at a peripheral location on said disk and having a cutting portion tapering to a mere point which is disposed slightly outward of the circumference of the disk and obliquely forward in the direction of rotation of the disk, said drill being adapted to drill a pilot hole and to pilot a concentric cutting by said cutting tool, a larger diameter disk adjustably fixed on said rod and adapted to be adjusted axially toward and from the first mentioned disk, pilot means on the larger disk having exterior diameter for nicely fitting within the circle of cutting of said cutting tool on the first mentioned disk, said larger diameter disk being adapted to be fixed on said rod at a location relative to the first mentioned disk whereby said pilot means can enter the hole bored by the cutters of the first mentioned disk while the latter said disk continues in said hole, a cutting tool mounted at a peripheral location on the larger disk and having a cutting point disposed slightly outward of the circumference of the larger disk and projected obliquely outward relative to the peripheral surface of the larger disk to a point appreciably in advance of the larger disk and projected obliquely forward in the direction of rotation of the said disks, and a plurality of cutting blades on each disk having radially disposed cutting edges slightly in advance of the respective disks, the said cutting edges of the blades on the smaller disk being in a common plane and having radial extent for gradual removal of material outward of said pilot hole and within the circle of cutting of the cutting tool on the smaller disk, and the said cutting edges of the blades on the larger disk being in a common plane and having radial extent for gradual removal of material outward of the hole bored by the cutters on the smaller disk and within the circle of cutting of the cutting tool on the larger disk, said pilot means on the larger disk fitting and entering the hole bored by the cutters on the smaller disk while said smaller disk is within said hole.

JOHN J. O'BRIEN.

References Cited in the file of this patent

UNITED STATES PATENTS

| Number | Name | Date |
|---|---|---|
| 654,861 | Tynan | July 31, 1900 |
| 1,165,854 | Davis | Dec. 28, 1915 |
| 2,320,612 | Kandle | June 1, 1943 |
| 2,517,374 | Amon | Aug. 1, 1950 |

FOREIGN PATENTS

| Number | Country | Date |
|---|---|---|
| 179 | Great Britain | Jan. 4, 1910 |